(12) United States Patent
Wolff-Petersen et al.

(10) Patent No.: US 10,286,320 B2
(45) Date of Patent: May 14, 2019

(54) APPARATUS AND METHOD FOR ENHANCING SOUND PRODUCED BY A GAMING APPLICATION

(71) Applicant: STEELSERIES APS, Frederiksberg (DK)

(72) Inventors: Jacob Wolff-Petersen, Richmond (GB); Tino Soelberg, Valby (DK); Ed Guntin, Barrington, IL (US)

(73) Assignee: STEELSERIES ApS, Frederiksberg (DK)

( * ) Notice: Subject to any disclaimer, the term of this patent is extended or adjusted under 35 U.S.C. 154(b) by 328 days.

(21) Appl. No.: 15/158,269

(22) Filed: May 18, 2016

(65) Prior Publication Data

US 2016/0263480 A1 Sep. 15, 2016

Related U.S. Application Data

(63) Continuation of application No. 14/042,603, filed on Sep. 30, 2013, now Pat. No. 9,364,745, which is a continuation of application No. 12/558,240, filed on Sep. 11, 2009, now Pat. No. 8,577,049.

(51) Int. Cl.
| | |
|---|---|
| *A63F 13/79* | (2014.01) |
| *A63F 13/60* | (2014.01) |
| *A63F 13/63* | (2014.01) |
| *A63F 13/54* | (2014.01) |
| *A63F 13/40* | (2014.01) |
| *A63F 13/00* | (2014.01) |
| *A63F 13/215* | (2014.01) |

(52) U.S. Cl.
CPC ............. *A63F 13/60* (2014.09); *A63F 13/00* (2013.01); *A63F 13/10* (2013.01); *A63F 13/215* (2014.09); *A63F 13/54* (2014.09); *A63F 13/63* (2014.09); *A63F 13/79* (2014.09); *A63F 2300/5546* (2013.01); *A63F 2300/6081* (2013.01)

(58) Field of Classification Search
CPC .......... A63F 13/60; A63F 13/63; A63F 13/54; A63F 13/79; A63F 13/99; A63F 13/10
USPC ..................................... 381/59-60
See application file for complete search history.

(56) References Cited

U.S. PATENT DOCUMENTS

| | | | |
|---|---|---|---|
| 5,197,332 A | 3/1993 | Shennib | |
| 7,190,795 B2 | 3/2007 | Simon | |
| 7,288,071 B2 | 10/2007 | Harrison | |
| 7,529,545 B2 | 5/2009 | Rader et al. | |
| 7,564,979 B2 | 7/2009 | Swartz | |
| 7,734,055 B2 | 6/2010 | Chiloyan | |
| 7,885,416 B2 | 2/2011 | Chalupper | |
| 8,121,302 B2 | 2/2012 | Skuruls et al. | |
| 8,477,953 B2* | 7/2013 | Hobson | H01R 13/748 381/59 |
| 8,571,242 B2* | 10/2013 | Bachler | H04R 25/353 363/16 |
| 2003/0016985 A1* | 1/2003 | Patel | G06F 3/021 400/489 |

(Continued)

*Primary Examiner* — Disler Paul
(74) *Attorney, Agent, or Firm* — Guntin & Gust, PLC; Jay Anderson

(57) ABSTRACT

A system that incorporates teachings of the present disclosure may include, for example, a computing device having a controller to modify sound produced by a gaming application according to an otological profile of a user. Additional embodiments are disclosed.

20 Claims, 9 Drawing Sheets

(56) References Cited

U.S. PATENT DOCUMENTS

| | | | |
|---|---|---|---|
| 2003/0064746 A1* | 4/2003 | Rader | H04R 25/70 |
| | | | 455/550.1 |
| 2006/0008092 A1 | 1/2006 | Baril et al. | |
| 2007/0013651 A1* | 1/2007 | Depue | G06F 3/03543 |
| | | | 345/156 |
| 2007/0216651 A1* | 9/2007 | Patel | G06F 3/0237 |
| | | | 345/168 |
| 2008/0024327 A1* | 1/2008 | Downs | G06F 3/0202 |
| | | | 341/22 |
| 2008/0187146 A1 | 8/2008 | Yanz | |
| 2008/0303787 A1* | 12/2008 | Zheng | A63F 13/06 |
| | | | 345/156 |
| 2010/0202625 A1 | 8/2010 | Boretzki | |
| 2011/0044483 A1 | 2/2011 | Edgar et al. | |

* cited by examiner

| Action Center | Statistics | Offer/Updates | Switch to device view |
|---|---|---|---|

| Key | Time | Key presses |
|---|---|---|
|  | 04:16:15 | 403 |
|  | 04:33:16 | 479 |
|  | 03:52:39 | 455 |
|  | 03:32:11 | 403 |
| Alt | 03:32:11 | 311 |
| Ctrl A | 00:01:22 | 265 |
| F7 | 00:00:02 | 1 |

302

Usage Suggestions

- Consider replacing <Alt> with a macro triggered by <Ctrl F> to improve response time and free the user's right hand for other tasks. The "Ctrl" key on the left side of the keyboard can be held down while the user's fingers toggle between the "A" and "F" keys.

- Alternatively, consider creating single button macros for <Ctrl A> and <Alt> which can be assigned to keys on the keyboard or left-right buttons on a mouse.

• • •

304

Playback Panel

Time: 00:00:00

Playback Control
◁ ☐ ◯◯ △ ▷ ▷▷

Load    Save

300
FIG. 3

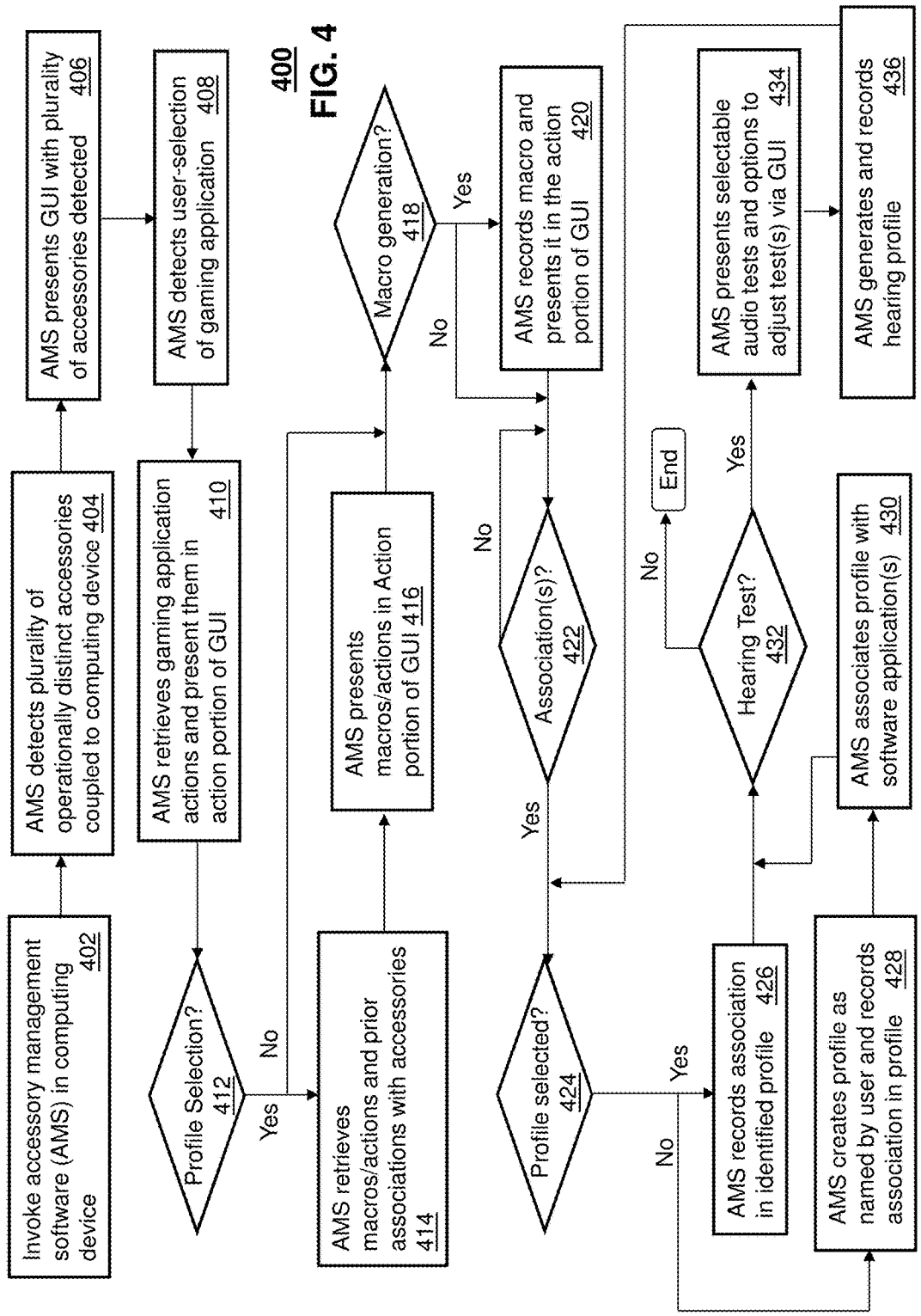

APPARATUS AND METHOD FOR ENHANCING SOUND PRODUCED BY A GAMING APPLICATION

CROSS-REFERENCE TO RELATED APPLICATIONS

This application is a continuation of U.S. application Ser. No. 14/042,603, filed Sep. 30, 2013, which is a continuation of U.S. application Ser. No. 12/558,240, filed Sep. 11, 2009 (now U.S. Pat. No. 8,577,049), the disclosures of which are incorporated herein by reference in their entirety.

FIELD OF THE DISCLOSURE

The present disclosure relates generally to gaming applications, and more specifically to an apparatus and method for enhancing sound produced by a gaming application.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to listen to sounds produced by a gaming application and to communicate with other players, a joystick, a computer display, or other common gaming accessories.

A gamer can frequently use a combination of these accessories in one game (e.g., headset, a keyboard, and mouse). Efficient management and utilization of these accessories can frequently impact a gamer's ability to compete.

BRIEF DESCRIPTION OF THE DRAWINGS

FIG. 3 depicts another illustrative embodiment of a GUI generated by an AMS application according to the present disclosure;

FIGS. 4-6 depict illustrative methods describing the operation of the AMS application;

DETAILED DESCRIPTION

One embodiment of the present disclosure entails a computer-readable storage medium having computer instructions to cause a sequence of a plurality of audio tests to be audibly presented to a user of a gaming application, receive a plurality of indications of the user's ability to sense the plurality of audio tests, modify sound produced by the gaming application according to the plurality of indications, and present the modified sound.

One embodiment of the present disclosure entails a computing device having a controller to modify sound produced by a gaming application according to an otological profile of a user.

One embodiment of the present disclosure entails a method operable in a gaming application to modify sound produced by the gaming application according to an otological profile of a user.

FIGS. 1A-1B and 2-3 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, or a gaming console. A gaming console can represent a gaming device such as a Playstation 3™, a Wii™, or an Xbox360™. Other present and next generation gaming consoles are contemplated. The AMS application can also operate in other computing devices with less computing resources such as a cellular phone, a personal digital assistant, or a media player (such as an iPOD™). From these illustrations it would be apparent to an artisan with ordinary skill in the art that the AMS application can operate in any device with computing resources.

Figure 1A:
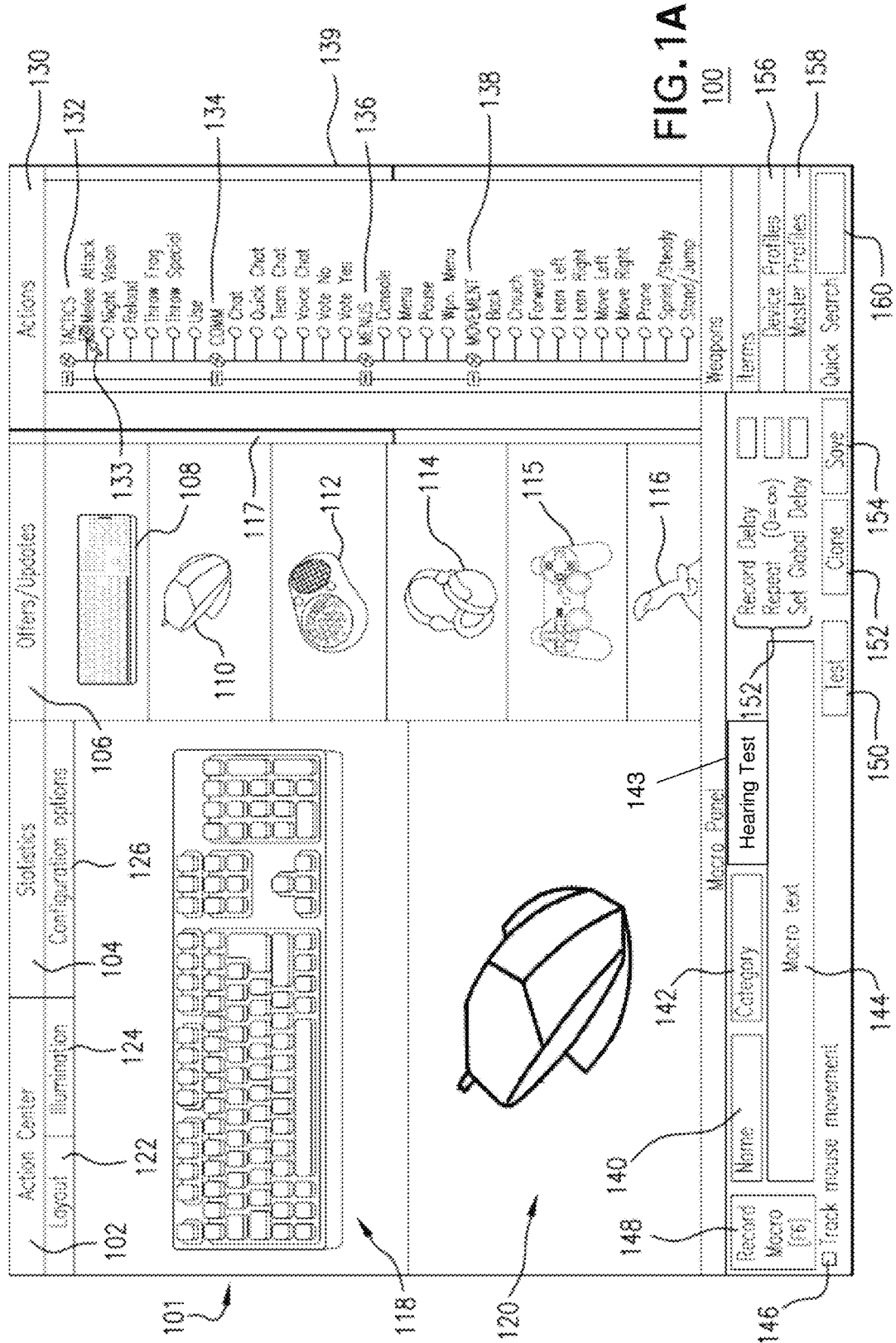
FIG. 1A depicts an illustrative embodiment of a Graphical User Interface (GUI) generated by an Accessory Management Software (AMS) application according to the present disclosure.
Figure 1B:
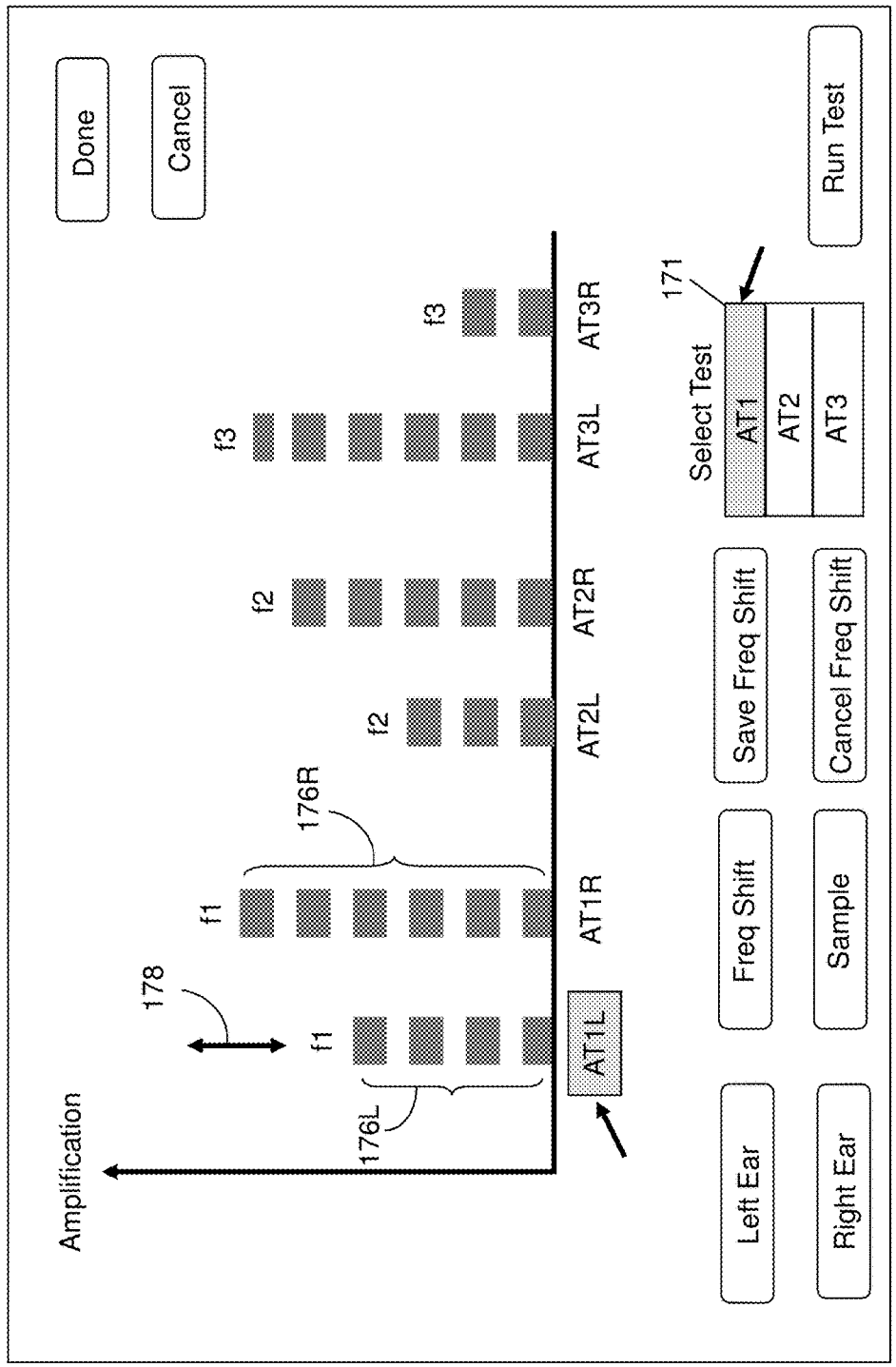
FIG. 1B depicts another illustrative embodiment of a GUI generated by an AMS application according to the present disclosure.
Figure 2:
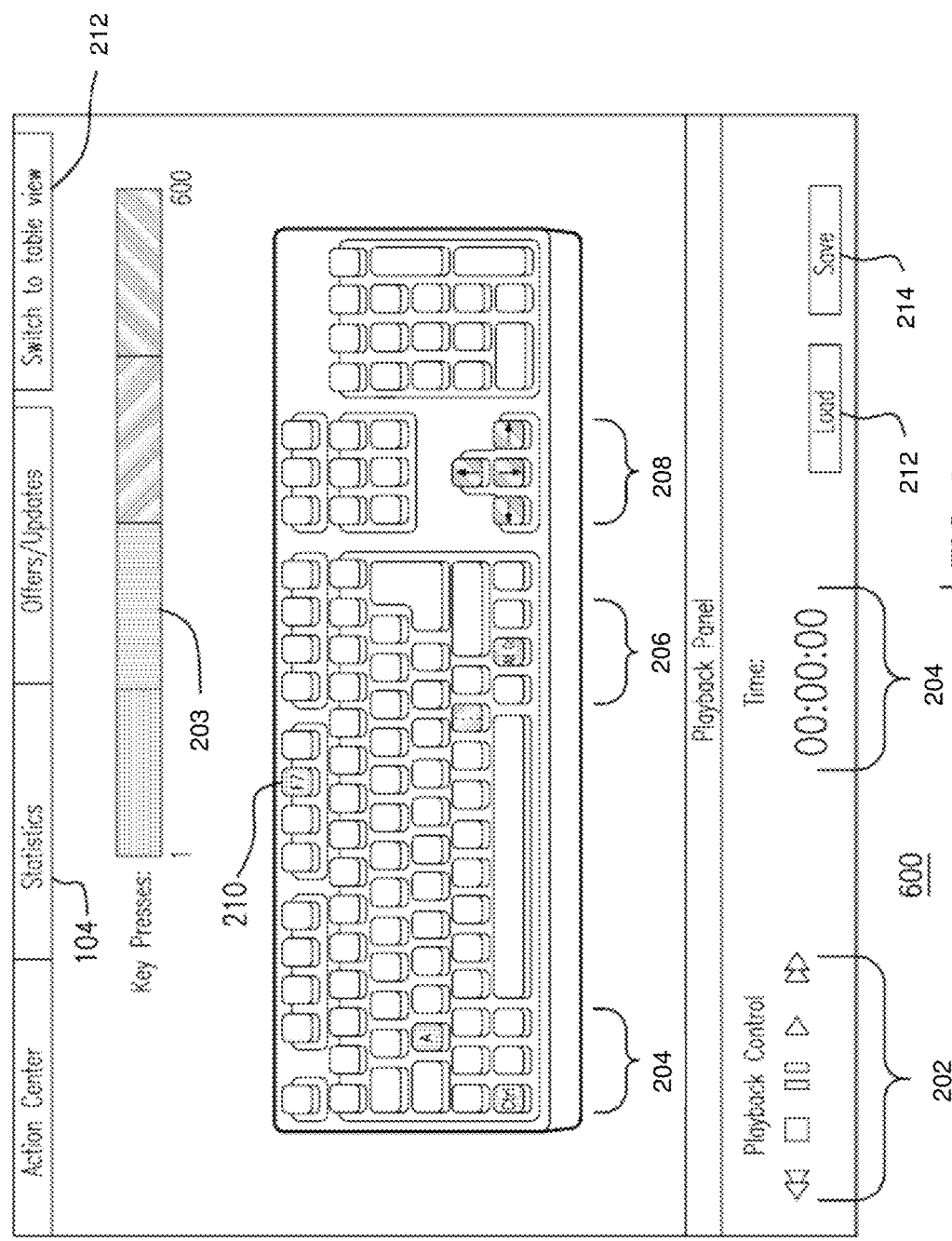
FIG. 2 depicts another illustrative embodiment of a GUI generated by an AMS application according to the present disclosure.
Figure 5:
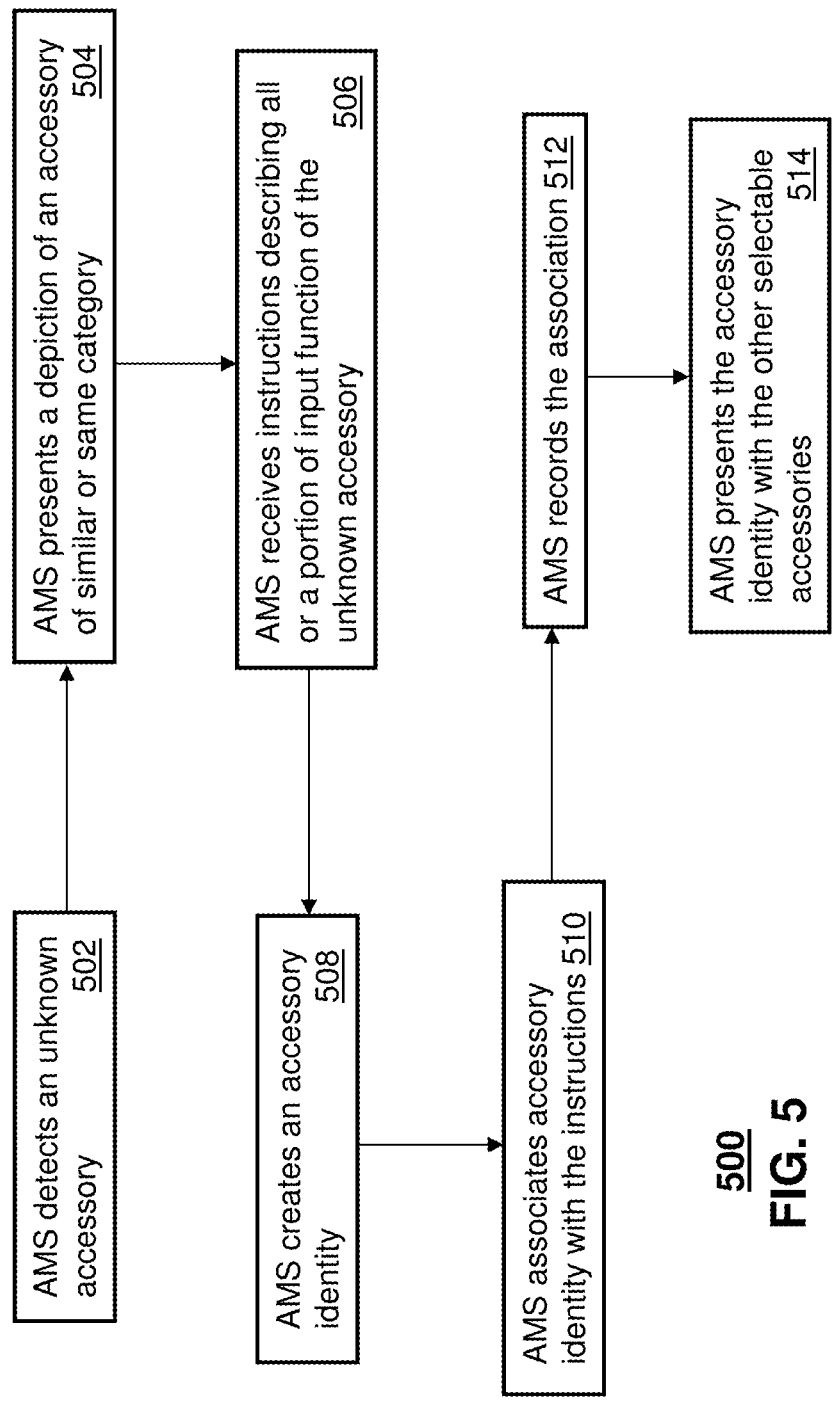
Figure 6:
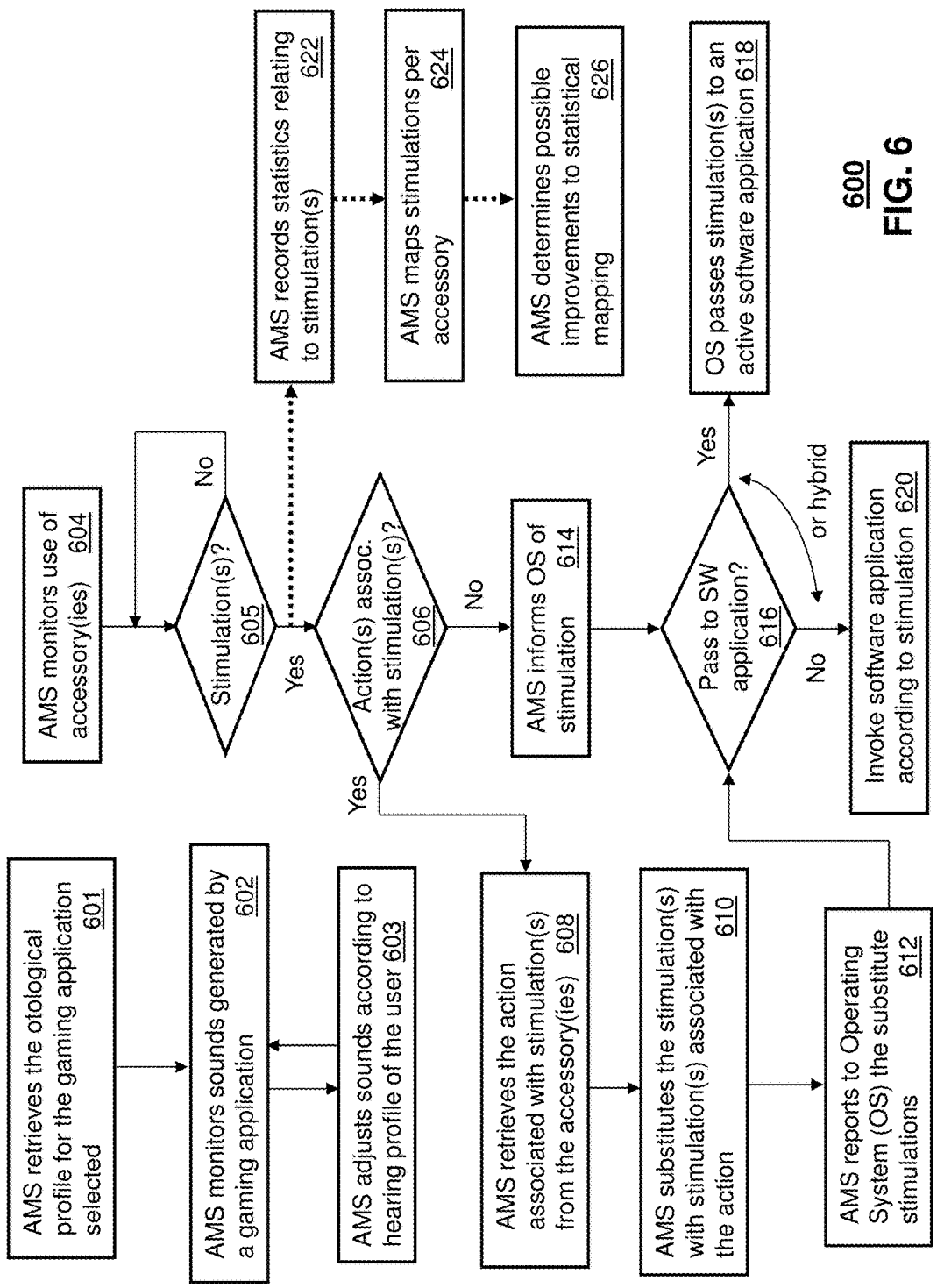

FIGS. 4-6 depict illustrative methods 400-600 describing the operation of the AMS application as shown in FIGS. 1-3. Method 400 can begin with step 402 in which the AMS application is invoked in a computing device. The invocation step can result from a user selection of the AMS application from a menu or iconic symbol presented on a desktop of the computing device by an operating system (OS) managing operations thereof. In step 404, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks, game controllers or any other input devices represent additional categories of accessories supported by the AMS.

In step 406, the AMS application can present a GUI 101 such as depicted in FIG. 1 with operationally distinct accessories such as the keyboard 108 and mouse 110. The GUI 101 presents the accessories 108-116 in a scrollable section 117. One or more accessories can be selected by a user with a common mouse pointer. In this illustration, the keyboard 108 and mouse 110 were selected with a mouse pointer for customization. Upon selecting the keyboard 108 and mouse 110 in section 117, the AMS application presents the keyboard 108 and mouse 110 in split windows 118, 120, respectively, to help the user during the customization process.

In step 408, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or mouse 110 to make an association with an input function of one of these accessories.

For example, the user can drag the Melee Attack symbol to the right mouse button thereby causing an association between the selection of the right mouse button and the gaming action of a Melee Attack. When the right button of the mouse 110 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. A command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing. Once the macro has been fully defined, selection of button 154 records the macro in step 420. The recording step can be combined with a step for adding the macro to the associable items Actions column 130, thereby providing the user the means to associate the macro with input functions of the accessories.

In step 422, the AMS application can respond to drag and drop associations between actions and input functions of the keyboard 108 and the mouse 110. If an association is detected, the AMS application can proceed to step 424 where it can determine if a profile has been identified in step 412 to record the association(s) detected. If a profile has been identified, the associations are recorded in said profile in step 426. If a profile has not been identified in step 412, the AMS application can create a profile in step 428 for recording the detected associations. In the same step, the user can name the newly created profile as desired. The newly created profile can also be associated with one or more software applications in step 430 for future reference.

Once the associations have been recorded in the profile, the AMS application can proceed to step 432 to determine if the user desires to perform a hearing perceptiveness test. FIG. 1B provides an illustrative embodiment of a GUI for a performing an audio test, while also providing the user the ability to adapt the result of each audio test. Step 432 can be invoked by selecting GUI button 143 of FIG. 1A with a mouse pointer.

In step 434, the AMS application can present a GUI 170 with selectable audio tests and options to adjust each test independently. Each audio test (ATn) can present one or more audio tones within a given spectral segment. In the present illustration, however, an audio test (such as AT1) produces a single audio tone ($f_1$) to simplify the illustration. The GUI 170 presents selectable audio tests (ATn) in a menu 171 which can be selected with a mouse pointer.

A user can either select a particular audio test such as AT1 by way of menu 171, or the AMS application can sequence between audio tests in a predetermined order, which may or may not be sequential. Once the test is selected, the test can be invoked by selecting the Run Test button. During the hearing test, the user can wear a common audio headset (such as 114 of FIG. 1A) coupled to a common audio port of the computing device from which the AMS application operates. With a headset, the AMS application can present an audio test tone in one ear first then the other. The audio tone can be played at a high volume and lowered incrementally or vice-versa as part of a hearing test.

Prior to testing, the AMS application can ask the user to select the left ear button or the right ear button to indicate which ear the user has heard a tone. The volume of the test tone can be varied by the AMS application to determine the user's hearing range in each ear. Based on the indications supplied by the user (left/right ear button depressions), the results of the audio test of each ear can be presented by the AMS application in the GUI 170. The intensity required for the user to hear the audio tone in each ear can be represented by vertical bars for each ear.

The results of the left ear audio test 1 (AT1L) and right ear audio test 1 (AT1R) are shown with independent vertical bars 176L and 176R, respectively. The less bars the less audio energy was required for the user to perceive the audio tone, and vice-versa. In this illustration, the user had more sensitivity in the left ear than the right, which is reflected by the lesser bars for AT1L.

The AMS application can continue with each subsequent audio test (AT2, AT3 . . . ATn) until all tests have been completed. The culmination of the of all audio test results can be used to generate in step 436 an otological profile of the user, which identifies in part the user's hearing ability over spectral segments defined by audio tones at various frequencies (f1, f2, f3, and so on). The AMS application can stop at this stage and record the otological profile in step 436 which can then be associated to a gaming profile identified in step 412 or in step 428. The otological profile can be later retrieved by the AMS application to modify sounds generated by a gaming application to enhance the user's gaming performance as will be described shortly.

In another embodiment, the user can request that the AMS application shift sounds near the range of the audio test tone (e.g., +/−500 Hz in the range of audio tone $f_n$) for a particular ear which the user had trouble hearing to another frequency which the user may be better suited to perceive sound. This request can be invoked by selecting the Freq Shift button while in a particular audio test (e.g., AT1). The AMS application can determine, for example, that for audio test AT1 the user performed poorest in was the right ear.

With this understanding the AMS application can shift a range of sounds near the frequency of the audio test tone of AT1 ($f_1$) to another frequency (e.g., $f_1$+/−500 Hz is shifted up or down in frequency to a new target frequency $f_t$ which it knows the user can perceive better in the right ear.) The determination of which frequency to use may be extrapolated from the otological profile, or can be determined by the AMS by retesting the user at a new frequency in one or both ears. To maintain symmetry in the frequency shifted sounds, the AMS application can be programmed to apply the frequency adaptation to both ears rather than just the affected ear.

To assist the user in determining the desirability of the frequency shift, the user can select a Sample button which can play sample sounds before and after the frequency shift. That is, sounds ranging in $f_1$+/−500 Hz can be played unaltered first. The same sounds can then be shifted to the target frequency $f_t$ and replayed for the user. If the user finds the adaptation acceptable, s/he can select the Save Freq Shift button; otherwise, the user can select the Cancel Freq Shift button to undo the adaptation. If the user cancels the adaptation, the Freq Shift button can be pressed again and the AMS can try a new target frequency which the user can then resample.

In addition to frequency shifting segments of spectral audio content, the user can also be given the option to augment or reduce the audio energy of each tone. For example, the user can augment or reduce the audio energy of the $f_1$ tone by selecting AT1L with the mouse pointer. Once an indication is provided that AT1L has been selected (e.g., highlighting the AT1L symbol or changing the color of the vertical bars), the user can add more vertical bars, or reduce the number of vertical bars by dragging the top bar with the mouse pointer up or down, or by selecting keyboard keys such as "+" or "−". By raising the bars, the user can indicate to the AMS application a desire to augment the audio energy of sounds in a range of the $f_1$ tone for the left ear. Similarly, by lowering the bars, the user can indicate to the AMS application a desire to reduce the audio energy of the $f_1$ tone for the left ear. This technique can be applied to each ear for each audio test.

Once the user is satisfied with the audio tests and perhaps has made adaptations to the otological profile using frequency shifting or audio augmentation or reduction as described above, the user can select the Done button which transitions the AMS application from step 434 to 436. In step 436 the original or adapted otological profile is recorded and associated with a gaming profile as previously described.

The steps of method 400 in whole or in part can be repeated until a desirable otological profile and pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard from an unknown vendor by way of a communicative coupling to a computing device from which the AMS application operates. The AMS application in this instance can receive an identity from the keyboard or the operating system which is not known the AMS application. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to the keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device.

FIG. 6 depicts a method 600 for illustrating the AMS application while a user is utilizing a gaming application. Method 600 can begin with step 601 in which the AMS application retrieves a otological profile associated with the gaming application selected by the user. In step 602 the AMS application can monitor sounds generated by the gaming application which it can adjust in step 603 according to the otological profile recorded in step 436. Step 603 can be implemented by the AMS application utilizing common sound detection and sound processing techniques that provide a means to adjust audio energy and frequency shifting of original gaming sounds as earlier described to enhance the user's ability to better perceive the sounds in the gaming application.

Figure 7:
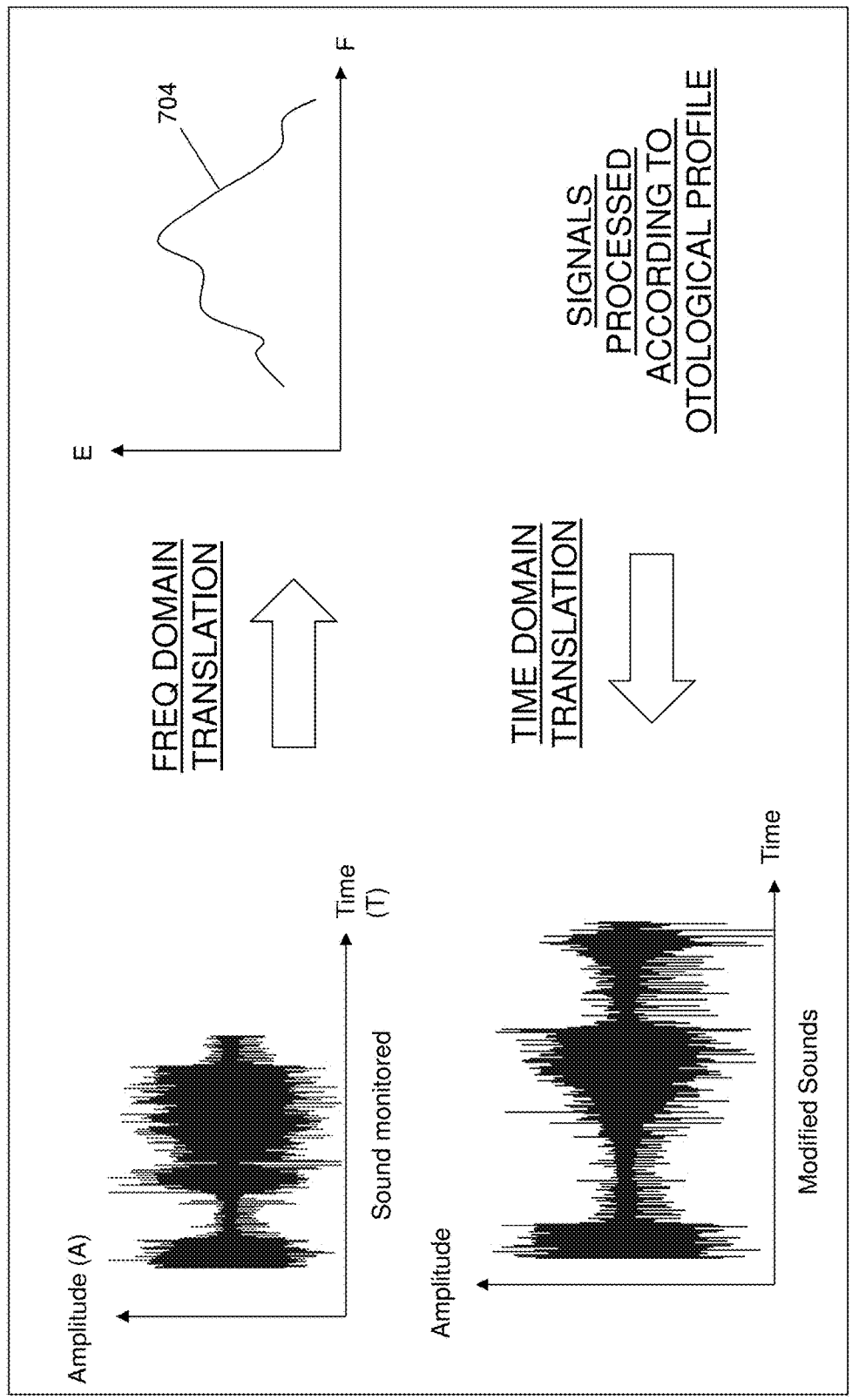
FIG. 7 depicts an illustrative embodiment for detecting sounds according to the method of FIG. 6.

The AMS application can, for example, digitally sample sound, and translate time domain signals to frequency domain signals for processing purposes utilizing a Fourier transform. By translating between domains, applying common filtering and spectral profile comparison techniques, the AMS application can detect sounds in specific frequency ranges which it can then adapt according to the otological profile of the user—see illustration of FIG. 7. By adjusting the audio energy and/or frequency shifting signals the user has trouble hearing, the user can better hear the sounds produced by the gaming application, which may improve the user's performance, and enhance his/her experience.

Steps 601-603 can operate independently of the operations of steps 604-626.

Turning attention to step 604, this step can represent monitoring the stimulation of input functions of one or more accessories communicatively coupled to a computing device from which the AMS application operates. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. Other existing or future input functions of an accessory detectable by the AMS application is contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 608 where it retrieves the stimulation definition of these actions for each accessory reporting a stimulation. In step 610, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 610, the AMS application would substitute "Ctrl A" for stimulations consisting of the mouse clicks, navigation and a request for an IM application. The substitute stimulations would then be reported in step 612 to an operating system (OS).

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft) awaiting stimulation data from the computer system. In this illustration, the macro comprises both stimulation feedback for the active software application and a request to initiate an IM session. Accordingly, the OS conveys in step 618 the mouse stimulation signals to the active software application (e.g., gaming application), and in a near simultaneous fashion invokes the IM session in step 620 with a specific individual (or organization).

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on the depressions of "Ctrl A" has no particular association to an action. In this case, the AMS application passes this stimulation to the OS with no substitutes. In step 616 the OS can determine if this stimulation invokes a new software application in step 620 or is conveyed to the previously initiated software application.

Contemporaneous to the embodiments described above, the AMS application can also record in step 622 statistics relating to the detected accessory stimulations. A portion of the AMS application can operate as a background process which performs statistical analysis on the stimulations detected. By selecting button 104 in FIG. 1, the AMS application can provide an updated GUI which illustrates the usage of input functions of one or more accessories for which stimulations were detected in step 604. For ease of illustration, only a keyboard accessory is shown. In this illustration, certain keys (references 204, 206 208, 210) on the keyboard are color-coded to illustrate the frequency of usage of these keys.

A color scale 203 defines the frequency of usage of the input functions of the keyboard. The color scale 203 should not be confused with the color scales of FIGS. 1B-1C. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 208 depict a color coding with the highest detectable usage, while the F7 key (reference 210) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics from a given session.

The GUI of FIG. 2 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 2.

In addition to a symbolic representation as shown in FIG. 2, the AMS application can provide the user a means to visualize raw statistics in a table format such as shown in FIG. 3 by selecting button 212. The table format shows raw data in section 302 and possible suggestions in section 304 for improving user performance which can be generated by the AMS application in step 626. Section 302 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt .> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt .> and <Ctrl A> which can be assigned to keys on the keyboard or left and right buttons of a mouse. The latter suggestion of assigning macros to the mouse can help the user free up his/her left hand.

Although not shown in section 304, the AMS application can also be programmed to suggest alternative options for the color scales chosen in FIGS. 1B-1C. The AMS application can for example detect that the most frequently used keys may lead the user to visualize a color scale better if it were move to another location of the accessory. For example, the color scale of the mouse 110 may be hidden by the user's hand. Accordingly, the AMS application may recommend that the color scale for enemy proximity be move to another accessory such as the keyboard 108 in an area with minimal use (e.g., the keys above the arrows—Delete, Insert, Page Up/Down, and Home, End, etc.).

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIG. 1), an understanding of the associations made by other users (e.g., gamers) to improve their performance when controlling the software, and so on. The AMS application can also be adapted to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, method 400 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory.

The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 1→layer 2→layer 3→to layer 1→and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, etc.

In another embodiment, method 400 can be adapted so that a user can define super macros and/or super profiles. A super macro can represent nested macros (combinations of macros). Method 400 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

In yet another embodiment, the AMS application can be adapted to receive an otological profile from a device other than the computing device from which the AMS application operates. For example, the otological profile can be generated by a common hearing testing device used by a physician. The hearing test performed by the AMS application can also use advanced technologies capable of determining an otological profile of a user without user interaction. In yet another embodiment, the AMS application can perform frequency shifting as described earlier automatically without invocation by a user. In another embodiment, the AMS application can be adapted to identify pertinent sounds produced by the gaming application (e.g., footsteps, weapon reload, etc.), and adjust the otological profile of the user according to these sounds to enhance the user's ability to perceive them. The enhancement can be based on a change in audio magnitude, and/or frequency shifting.

In another embodiment, the AMS application can be adapted to operate as an integral part of the gaming application. Accordingly, once actions have been associated with accessories and an otological profile has been defined, such settings can be integral to the gaming application. Method 600 can then be applied by the gaming application to provide results similar to those described above.

The embodiments of the present disclosure can also be applied to non-gaming applications which have an interactive user component. For example, the disclosed embodiments can be applied to educational tools that produce an interactive audio experience (e.g., tools for learning other languages). The present disclosure can also be applied to non-interactive applications where the user could benefit by adapting sounds produced thereby according to the user's otological profile.

A super profile can also comprise sub-profiles, each sub-profile defining an otological profile for a sub-function of a particular gaming application. A sub-function can represent for example a selection of an avatar from a list of possible avatars in the gaming application. For instance a user of the AMS application can associate a warrior avatar with a desirable otological profile which can be stored in a sub-profile. The user can in the same instance associate a different otological profile for a military avatar and store this association in a different sub-profile. Both sub-profiles can then be stored by the AMS application in one super-profile which is associated with the gaming application from which the warrior avatar or military avatar is generated.

The user can then select the sub-profile prior to initiating the gaming application. Responsive to this selection, the AMS application can invoke the otological profile for the selected sub-profile. Alternatively, when the user selects the warrior avatar or the military avatar while the gaming application is in operation, the AMS application can detect the selection by way of an API of the gaming application and automatically select the sub-profile according to the detected avatar selection.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

Figure 8:
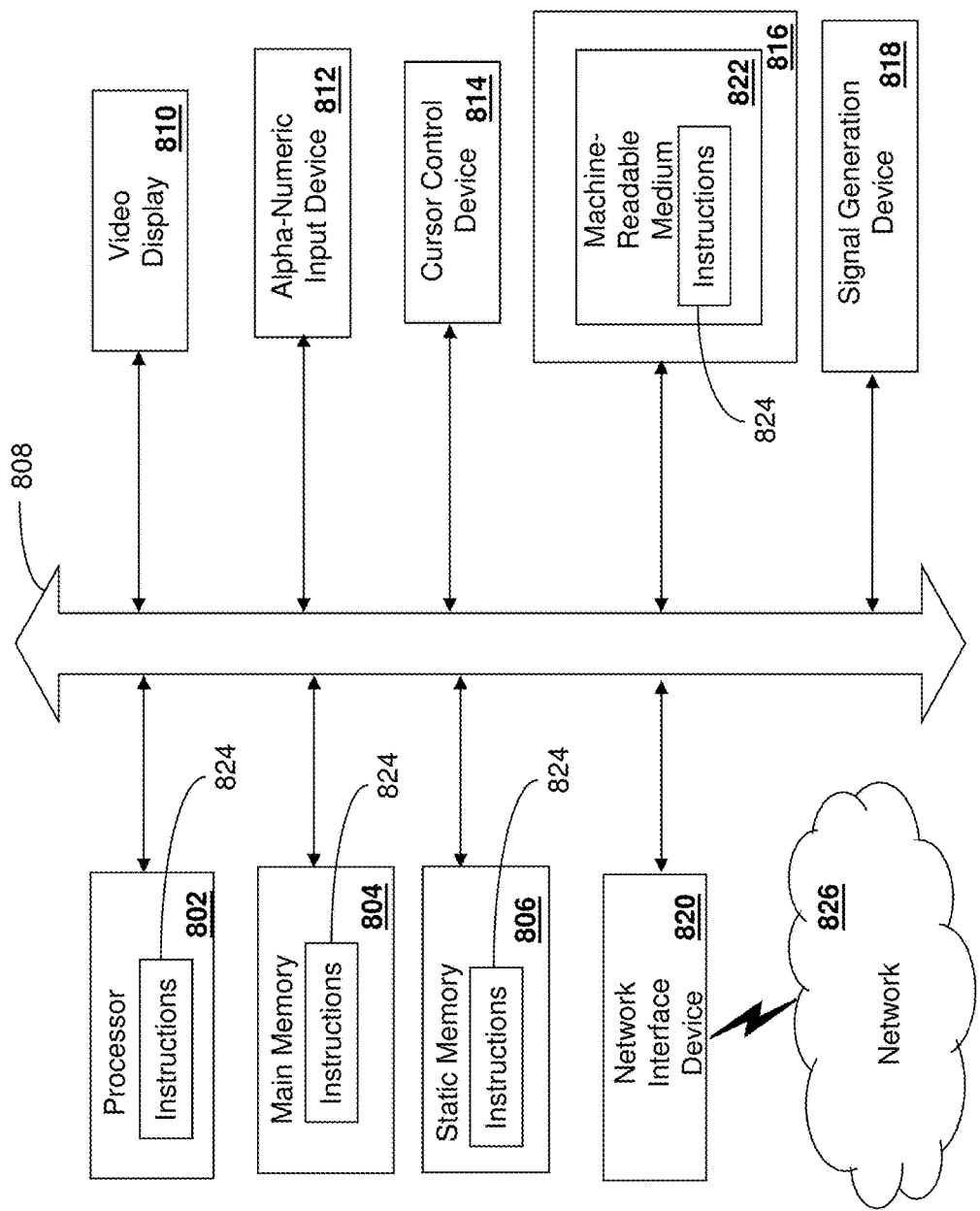
FIG. 8 depicts an illustrative diagrammatic representation of a machine in the form of a computer system within which a set of instructions, when executed, may cause the machine to perform any one or more of the methodologies disclosed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a memory storing instructions; and
    a controller coupled to the memory, wherein the controller, responsive to executing the instructions, performs operations comprising:
    detecting a selection of a software application, wherein the selection is initiated by an equipment of a user of the device; and
    adapting the software application to improve user response time and ergonomic use of an accessory coupled to the device, by:
        monitoring a gaming sound generated by the software application and adjusting the gaming sound in accordance with an otological profile of the user to provide an adjusted sound, wherein the adjusted sound has an audio energy and a frequency different from that of the gaming sound; and
        monitoring an input function of the accessory for making an input to the software application, detecting a stimulation of the input function of the accessory and recording statistics relating to the detected stimulation to identify a pattern of usage of the input function; and
        analyzing the statistics to determine an alternate configuration of the accessory in accordance with the pattern.

2. The device of claim 1, wherein the software application executes on a game device integral with or communicatively coupled with the device.

3. The device of claim 1, wherein the otological profile is associated with the software application.

4. The device of claim 3, wherein the software application is an interactive software application for determining the otological profile of the user.

5. The device of claim 1, wherein the adjusting comprises detecting sound in a specific spectral segment defined in the otological profile, and modifying spectral aspects of the detected sound.

6. The device of claim 1, wherein the adjusting comprises sampling the gaming sound to obtain a first time domain signal, translating the first time domain signal to a frequency domain signal, processing the frequency domain signal according to the otological profile, and translating the processed signal to a second time domain signal to obtain the adjusted sound.

7. The device of claim 1, wherein the operations further comprise providing a graphical user interface to present an illustration of usage of the input function.

8. The device of claim 7, wherein the illustration represents a frequency of usage of the input function.

9. The device of claim 7, wherein the accessory comprises a keyboard, and wherein the illustration comprises a color map of stimulations of the keyboard.

10. The device of claim 7, wherein the graphical user interface is presented as a split screen showing a plurality of accessories, each of the accessories having one or more detected stimulations.

11. A method comprising:
  detecting, by a device comprising a processor, a selection of a software application, wherein the selection is initiated by an equipment of a user of the device, and wherein the software application executes on a game device integral with or communicatively coupled with the device;
  adapting, by the device, the software application to improve user response time and ergonomic use of an accessory coupled to the device, the adapting comprising:
    monitoring a gaming sound generated by the software application and adjusting the gaming sound in accordance with an otological profile of the user to provide an adjusted sound, wherein the adjusted sound has an audio energy and a frequency different from that of the gaming sound;
    monitoring an input function of the accessory for making an input to the software application, detecting a stimulation of the input function of the accessory and recording statistics relating to the detected stimulation to identify a pattern of usage of the input function; and
    analyzing the statistics to determine an alternate configuration of the accessory in accordance with the pattern.

12. The method of claim 11, wherein the software application is an interactive software application for determining the otological profile of the user.

13. The method of claim 11, wherein the adjusting comprises detecting sound in a specific spectral segment defined in the otological profile, and modifying spectral aspects of the detected sound.

14. The method of claim 11, wherein the adjusting comprises sampling the gaming sound to obtain a first time domain signal, translating the first time domain signal to a frequency domain signal, processing the frequency domain signal according to the otological profile, and translating the processed signal to a second time domain signal to obtain the adjusted sound.

15. The method of claim 11, further comprising providing a graphical user interface to present an illustration of usage of the input function.

16. A non-transitory machine-readable storage medium, comprising executable instructions which, responsive to being executed by a processor of a device, cause the processor to perform operations comprising:
  detecting a selection of a software application, wherein the selection is initiated by an equipment of a user of the device; and
  adapting the software application to improve user response time and ergonomic use of an accessory coupled to the device, by:
    monitoring a gaming sound generated by the software, and adjusting the gaming sound in accordance with an otological profile of the user to provide an adjusted sound, wherein the adjusting comprises sampling the gaming sound to obtain a first time domain signal, translating the first time domain signal to a frequency domain signal, processing the frequency domain signal according to the otological profile, and translating the processed signal to a second time domain signal to obtain the adjusted sound; and
    monitoring an input function of the accessory for making an input to the software application, detecting a stimulation of the input function of the accessory and recording statistics relating to the detected stimulation to identify a pattern of usage of the input function; and
    analyzing the statistics to determine an alternate configuration of the accessory in accordance with the pattern.

17. The non-transitory machine-readable storage medium of claim 16, wherein the software application is an interactive software application for determining the otological profile of the user.

18. The non-transitory machine-readable storage medium of claim 16, wherein the operations further comprise providing a graphical user interface to present an illustration of usage of the input function.

19. The non-transitory machine-readable storage medium of claim 18, wherein the illustration represents a frequency of usage of the input function.

20. The non-transitory machine-readable storage medium of claim 18, wherein the graphical user interface is presented as a split screen showing a plurality of accessories, each of the accessories having one or more detected stimulations.

* * * * *